(12) United States Patent
Safavi

(10) Patent No.: US 12,511,525 B2
(45) Date of Patent: Dec. 30, 2025

(54) METHOD AND APPARATUS FOR POWER LINE COMMUNICATION NETWORK

(71) Applicant: Endura IP Holdings Ltd., George Town (KY)

(72) Inventor: Saeid Safavi, San Diego, CA (US)

(73) Assignee: Endura IP Holdings Ltd., George Town (KY)

( * ) Notice: Subject to any disclaimer, the term of this patent is extended or adjusted under 35 U.S.C. 154(b) by 1129 days.

(21) Appl. No.: 17/424,793

(22) PCT Filed: Jan. 23, 2020

(86) PCT No.: PCT/US2020/014811
§ 371 (c)(1),
(2) Date: Jul. 21, 2021

(87) PCT Pub. No.: WO2020/154514
PCT Pub. Date: Jul. 30, 2020

(65) Prior Publication Data
US 2022/0108160 A1   Apr. 7, 2022

Related U.S. Application Data

(60) Provisional application No. 62/797,090, filed on Jan. 25, 2019.

(51) Int. Cl.
*G06N 3/065* (2023.01)
*G06F 1/3206* (2019.01)

(52) U.S. Cl.
CPC ........... *G06N 3/065* (2023.01); *G06F 1/3206* (2013.01)

(58) Field of Classification Search
CPC ............................. G06N 3/065; G06F 1/3206
See application file for complete search history.

(56) References Cited

U.S. PATENT DOCUMENTS

| 3,881,097 A | * | 4/1975 | Lehmann | ............... | G01R 23/00 324/76.47 |
| 2003/0061004 A1 | * | 3/2003 | Discenzo | ............... | G06Q 10/06 702/182 |

(Continued)

FOREIGN PATENT DOCUMENTS

| CN | 106100903 A | * 11/2016 |
| WO | 2008099035 | 8/2008 |
| WO | 2020154514 | 7/2020 |

OTHER PUBLICATIONS

Young, Lee, International Search Report and Written Opinion received from the USRO dated May 22, 20 for appln. No. PCT/US2020/014811, 43 pgs.

(Continued)

*Primary Examiner* — Miranda M Huang
(74) *Attorney, Agent, or Firm* — KPPB LLP

(57) ABSTRACT

A reliable method and apparatus for communications over AC power lines that may have substantial interference is disclosed. A controller can be plugged into an AC outlet and communicate with a device plugged into any other AC outlet over the power lines within the facility. The controller may perform an analysis of the interference that is present on the power lines that run throughout the facility. In some cases, the particular path for power line signals can be selected to reduce the potential for interference. In some cases, the controller has a front end that comprises a Fast Fourier Transform (FFT) module and a neural network. In addition, devices under the control of the controller may have neural networks that can be used in combination to form a collaborative neural network.

10 Claims, 17 Drawing Sheets

(56) References Cited

U.S. PATENT DOCUMENTS

| | | | |
|---|---|---|---|
| 2007/0206345 A1* | 9/2007 | Kodama | H04B 3/542 |
| | | | 361/601 |
| 2008/0055067 A1* | 3/2008 | Curt | H04L 43/50 |
| | | | 340/538.12 |
| 2009/0072985 A1 | 3/2009 | Patel et al. | |
| 2011/0228691 A1* | 9/2011 | Wu | H04W 72/542 |
| | | | 370/344 |
| 2016/0112263 A1* | 4/2016 | Henry | G01R 31/58 |
| | | | 370/250 |
| 2017/0078170 A1* | 3/2017 | Vasseur | H04L 41/142 |
| 2017/0272305 A1* | 9/2017 | Lu | H04W 72/21 |

OTHER PUBLICATIONS

Cichocki, et al., "Artificial Neural Networks for Real-Time Estimation of Basic Waveforms of Voltages and Currents", Power Industry Computer Application Conference, 1993, Conference Proceedings May 4-7, 1993, pp. 357-363.

Wang, Xin, International Preliminary Report on Patentability received from the USRO dated Aug. 5, 2021 for appln. No. PCT/US2020/014811, 6 pgs.

* cited by examiner

METHOD AND APPARATUS FOR POWER LINE COMMUNICATION NETWORK

TECHNICAL FIELD

The disclosed method and apparatus relates to communication systems and more particularly to a method and apparatus for communicating over power lines.

BACKGROUND

As smart homes and smart buildings are becoming more prevalent, technologies for controlling various devices and functions within a home or building are being developed. Some of the devices and functions that it is desirable to control include lighting, thermostats, door and window locks, security systems, etc. In addition, aesthetic features, such as colored lighting and artwork can be managed. Some of the systems that are currently available rely upon wireless communications to allow a controller to communicate commands to devices that are responsible for performing functions to be controlled. For example, Bluetooth or WiFi are commonly used to provide a medium over which a control device (such as a cellular phone) can control devices (such as lamps, thermostats, door locks, etc.). While these wireless connections are convenient and appropriate for many circumstances, they require at least a transmitter within the controller and a receiver within the device to be controlled. In many cases, they require a transceiver (combination receiver/transmitter) within both the controller and the device to be controlled.

In the case in which a cellular phone executing a cell phone application is used as the control device, the cost of the controller is relatively minimal. However, depending upon the number of devices to be controlled, the additional cost associated with providing a transceiver within each device to be controlled can become a financial burden to the system. In addition, such systems can be restricted in their range and reliability. This can be a substantial issue in the case of systems used to control functions that are located throughout a relatively large commercial building, such as a large hotel or factory. For example, a controller that is located a substantial distance from a particular set of devices to be controlled must communicate with the device in order to exert control over the functions of interest. However, interference and range limitations with Bluetooth or WiFi connections can be a significant problem. This may be particularly so in environments in which significant RF interference may be generated by sources, such as other wireless devices sharing the bandwidth, appliances (including vacuum cleaners, laundry machines, etc.) and factory machinery.

Other systems rely upon wired communications, such as different standards in powerline communications (e.g. HomePlug, Narrow Band-Power Line Communications (NB-PLC), etc.), or wired light control mechanisms (e.g., DMX). Using hard wired connections helps establish connectivity between a controller and the devices to be controlled in difficult environments. One communications protocol that uses such hard wired connections is known as DMX. DMX has been established by ESTA (Entertainment Services and Technology Association) for controlling devices, such as lights. The DMX protocol was initially designed and used to control lighting and stage effects for theatrical productions and commercial displays. However, this protocol is well suited for more general use in controlling lighting and other functions. For example, DMX-512 can be used to control large LCD or LED displays. DMX protocol can also be used on top of a PLC communication link to achieve DMX over power line communications.

A DMX-512 compliant signal has links that each comprises 512 channels. Each such group of 512 channels is referred to as a "Universe". Often times, a DMX based system will have multiple Universes controlled by one or more control panels. Each of the 512 channels of a Universe communicates an intensity value that is typically representative of an intensity level ranging from 0 to 100 percent. The intensity values are represented by 8-bit digital numbers. In the case of a system in which the DMX controller is controlling lighting, the intensity value sets the intensity of a lighting element associated with that channel. Each channel is time multiplexed over a serial communication link. One intensity value is carried in each channel. Devices to be controlled are assigned one channel for each feature to be controlled. The 8-bit intensity value allows each channel to carry a digital value from zero to 255, representing 256 unique intensity levels from 0 to 100 percent of full intensity.

Initially, DMX-512 systems were designed for data to be transmitted over a differential pair using EIA-485 voltage levels. Such DMX-512 systems have a bus network that is typically no more than 400 meters (1,300 ft.) long, with not more than 32 unit loads (typically, 32 individual devices connected) on a single bus. If more than 32 unit loads need to be supported, the network is expanded across parallel buses using DMX splitters. The shielded twisted pair used has a characteristic impedance of 120 Ohms. A termination resistor is provided at the end of the cable furthest from the controller to absorb signal reflections. Such DMX-512 systems typically have two twisted pair data paths. The specification only defines the manner in which one of the twisted pairs is to be used. Nonetheless, the second pair is required for compliance with the electrical specification.

FIG. 1 shows two frames 101a, 101b of a DMX signal 100. Each frame 101 communicates the intensity value 105 of one channel within a DMX Universe of the system. A frame 101 comprises a start bit 109, eight intensity bits 105 and two stop bits 111, for a total of 11 bits per frame 101.

FIG. 2 shows an entire packet 200. The packet 200 includes the two frames shown in FIG. 1. The packet 200 starts with at least 22 "break" bits 201. Each bit has a duration of a predetermined length. Break bits 201 are defined as being at a low voltage level (i.e., a logical "zero"). The break bits 201 are followed by at least 2 "mark" bits 203. Mark bits 203 are defined as being a high voltage level (i.e., logical "one"). Following the mark bits 203 are a series of frames 101. For example, in one system, the packet 200 consists of 512 frames 101. Each frame 101 communicates over an associated channel. Each channel is defined by a time slot within the packet 200. Each such time slot starts a predetermined time after the falling edge 207 of the "mark" 203. The transition from logical one to logical zero by the mark 203 indicates that the next bit time will carry the start bit of the first frame 105a of the packet 200.

FIG. 3 is a schematic showing a DMX system 300 including a DMX controller 301 and two lighting devices 303, 305, each lighting device having two lighting elements 307, 309, 311, 313. A serial bus 315 carries signals to each of the lighting elements 307, 309, 311, 313.

Returning attention to FIG. 2, first frame 101a is carried in a first channel. In one example system, the first frame 105a provides an intensity value 105a indicating an intensity level to which the first lighting element 307 of the first lighting device 303 is to be set. The second channel (not shown) provides an intensity value 105 that might represent the intensity level to which the second lighting element 309 of the first lighting device 303 is to be set. The third channel (not shown) might provide an intensity value 105 indicating an intensity level to which the first lighting element 311 of the second lighting device 305 is to be set, etc. It should be noted that for the sake of simplicity, FIG. 3 only shows two lighting devices 303, 305, each having two lighting element 307, 309, 311, 313. However, the system 300 might have as many as 512 lighting elements (not shown) that can be coupled to the DMX bus 315 and several more that might be coupled to other DMX buses (not shown) and controlled by the same controller 301 or by another controller (not shown). At the end of the packet 200, the signal goes to an idle state, which is defined as a logical one.

The DMX protocol is reasonably robust and allows lighting and other functions to be performed in challenging environments. However, the limitations on the length of a DMX bus and the need to run wire from the controller to each device to be controlled make it difficult to use this protocol in environments such as hotels and factories in which it might be desirable to control lighting and other functions.

FIG. 4 is an illustration of a system in which a wireless bridge formed using a controlling transmitter 402 and lighting device receivers 404, 406 allows signals to be communicated from a DMX controller 301 to lighting elements 307, 309, 311, 313. The wireless bridge eliminates the need to lay wires to connect the DMX controller 301 to the devices 307, 309, 311, 313. However, such wireless control systems have their own drawbacks, as noted above. For example, systems that use such a wireless bridge are susceptible to interference on the wireless connection and limitations on the distance between the transmitter 402 and receivers 406.

In addition to the above mentioned networks, there are currently networks that use PLC protocols for communicating information from power meters back to a utility billing office. These applications have few, and typically only one, meter connected to the power line network within the building or home. These systems do not scale for use in controlling large numbers of devices all connected to the same PLC network within a building or home.

Therefore, there is currently a need for a method and apparatus that can be used to reliably and economically control the functions of devices, such as lighting fixtures, in challenging environments, such as large commercial buildings, hotels and factories.

SUMMARY

The presently disclosed method and apparatus allows reliable communications over AC power lines of a relatively large building that may have substantial interference. A controller can be plugged into an AC outlet in the building and communicate over the power lines with a device plugged into any other AC outlet, assuming the two AC outlets are directly connected. In some embodiments, the controller performs an analysis of the interference that is present on the power lines that run throughout the building. By determining which frequencies are clear of interference at particular times, the controller can direct communications to devices plugged into the AC power line at various locations around the building in order to control one or more features of the device. For example, in some embodiments the controller can determine when interference is unlikely to be present at a particular frequency and select that particular frequency to be used to communicate commands to a device that is plugged into an AC outlet. Furthermore, a particular path can be selected for the signal through the mesh of power line connections to reduce the potential for interference. In some such embodiments, the path can be selected based on the propagation time required for the signal to propagate from controller to the device to be controlled. In other cases, a neural network can be used to identify signals that have arrived over the selected path. In some such cases, a probe can be sent from the controller to devices to be controlled to assist in training the neural network to detect the signal that will arrive with the least interference.

In some embodiments, the controller has a front end that comprises a Fast Fourier Transform (FFT) module. The FFT module provides frequency analysis that is used to determine when to transmit commands to each device and which frequencies are available to be used for such transmissions.

In some embodiments, a neural network or other artificial intelligence engine can be used to detect particular patterns in the interference that is present on the power lines that are routed throughout a building. Such patterns may include when interference is likely to occur, thus allowing accurate predictions to be made as to when to transmit commands. In many cases, the commands that are to be sent require relatively low data rates. Therefore, small windows in time in which information can be transmitted in bursts can be used by a controller to communicate commands to devices to be controlled. By listening to the interference present on the power lines and analyzing the interference with a spectrum analyzer, such as an FFT module, information regarding the times and frequencies at which interference occurs can be —fed— into the artificial intelligence engine to predict when such windows will be open.

BRIEF DESCRIPTION OF THE DRAWINGS

The disclosed method and apparatus, in accordance with one or more various embodiments, is described with reference to the following figures. The drawings are provided for purposes of illustration only and merely depict examples of some embodiments of the disclosed method and apparatus. When the same reference designation is shown in more than one figure, each of the features associated with that reference designation are the same.

These drawings are provided to facilitate the reader's understanding of the disclosed method and apparatus. It should be noted that the figures are not intended to be exhaustive or to limit the claimed invention to the precise form disclosed. It should be further understood that the disclosed method and apparatus can be practiced with modifications and alterations, and that the disclosure should include embodiments in which features of a particular example shown in one figure can be used together with compatible features shown in other figures. In addition, it should be noted that the features shown are not necessarily to scale.

DETAILED DESCRIPTION

Figure 5:
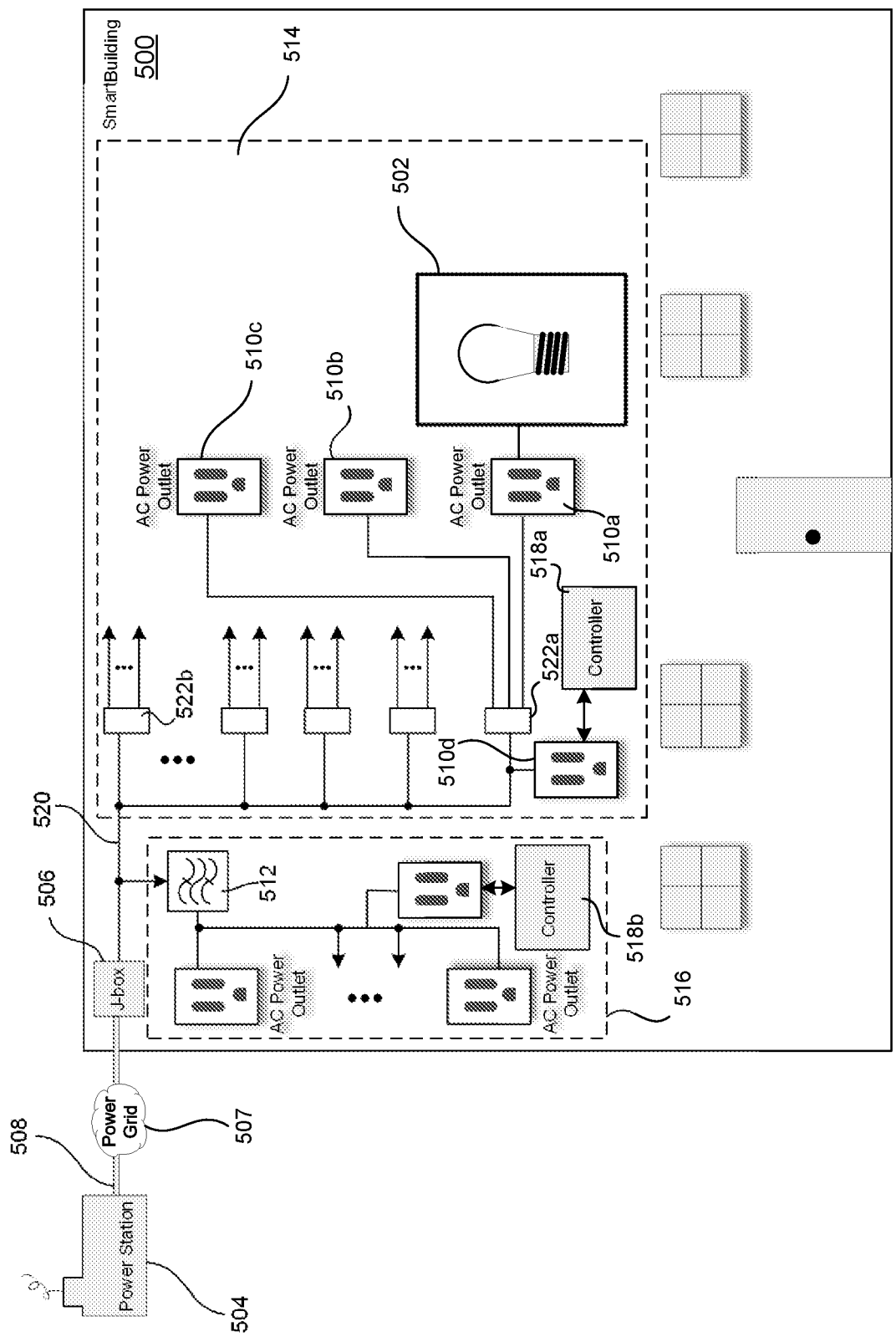
FIG. 5 is an illustration of a relatively large building, such as a factory or hotel, in which a power line based control system is provided to control functions of a plurality of devices.

FIG. 5 is an illustration of a relatively large building 500, such as a factory or hotel, in which a power line based control system is provided to control functions of a plurality of devices 502. It should be understood that the power line based control system disclosed herein could be used in smaller buildings or individual homes as well. In one embodiment, the devices under control are lighting fixtures 502. However, in alternative embodiments, the devices under control may be any device to which commands can be issued to control the functions associated with the device. Lighting fixtures are used herein merely as one example of a device that can be controlled by the disclosed power line controller.

Conventional 120V/240V 60 Hz alternating current (AC) power is generated at a power station 504. An AC power distribution grid 507 provides a power distribution network that allows AC power to be distributed to both residential and commercial users. In some cases, power is provided to the building 500 by a main line 508 off the power grid 507. In some such cases, the main line 508 is connected to a junction box (J-box) 506. The J-box 506 provides a connection point to a building 500 through which power received over the main power line 508 is distributed throughout the building 500. The J-box 506 can be located either inside or outside the building 500. It will be clear to those skilled in the art that the main power line 508 to the building shown in FIG. 5 is a conventional power line that supplies conventional AC power to the building 500. However, the particular manner in which power is brought to the building 500 can vary significantly. The power line control system disclosed herein is not dependent upon the particular configuration or manner in which the power is provided to the building 500. For example, in some cases, AC power might be provided to the building by a privately owned and operated generator. In such cases, the output of the generator (rather than the main line 508 from the power grid 507) might be connected to the J-box 506.

In some embodiments, there is an unobstructed electrical connection between the AC power outlets 510 within the building 500. However, in other embodiments, it is possible that the building-wide power distribution network that distributes AC power to the AC power outlets 510 throughout the building 500 may include devices that subdivide the AC power distribution network into isolated power sub-circuits 514, 516. Such devices may include filters 512 or other devices that may be used to filter, condition, isolate, provide fault protection or otherwise monitor and/or condition the signal.

The power lines within each sub-circuit 514, 516 (or the power lines throughout the entire building 500, in embodiments in which the power lines are all connected without interruption) form a communication bus 520 over which control signals can be transmitted to devices 502 plugged into AC power outlets within the same sub-circuit throughout the building 500. For the sake of simplicity, only one such device 502 is shown in FIG. 5. However, it will be clear to those skilled in the art that additional devices can be plugged into any of the outlets 510 within the building. In some embodiments, additional J-boxes 522 may be provided at various locations around the building 500 to more efficiently distribute power throughout the building 500. In the case in which such additional J-boxes 522 merely serve as connection points to distribute the signal, the J-boxes 522 will not impact the signal, other than to facilitate adding additional wire to the distribution network.

Figure 6:
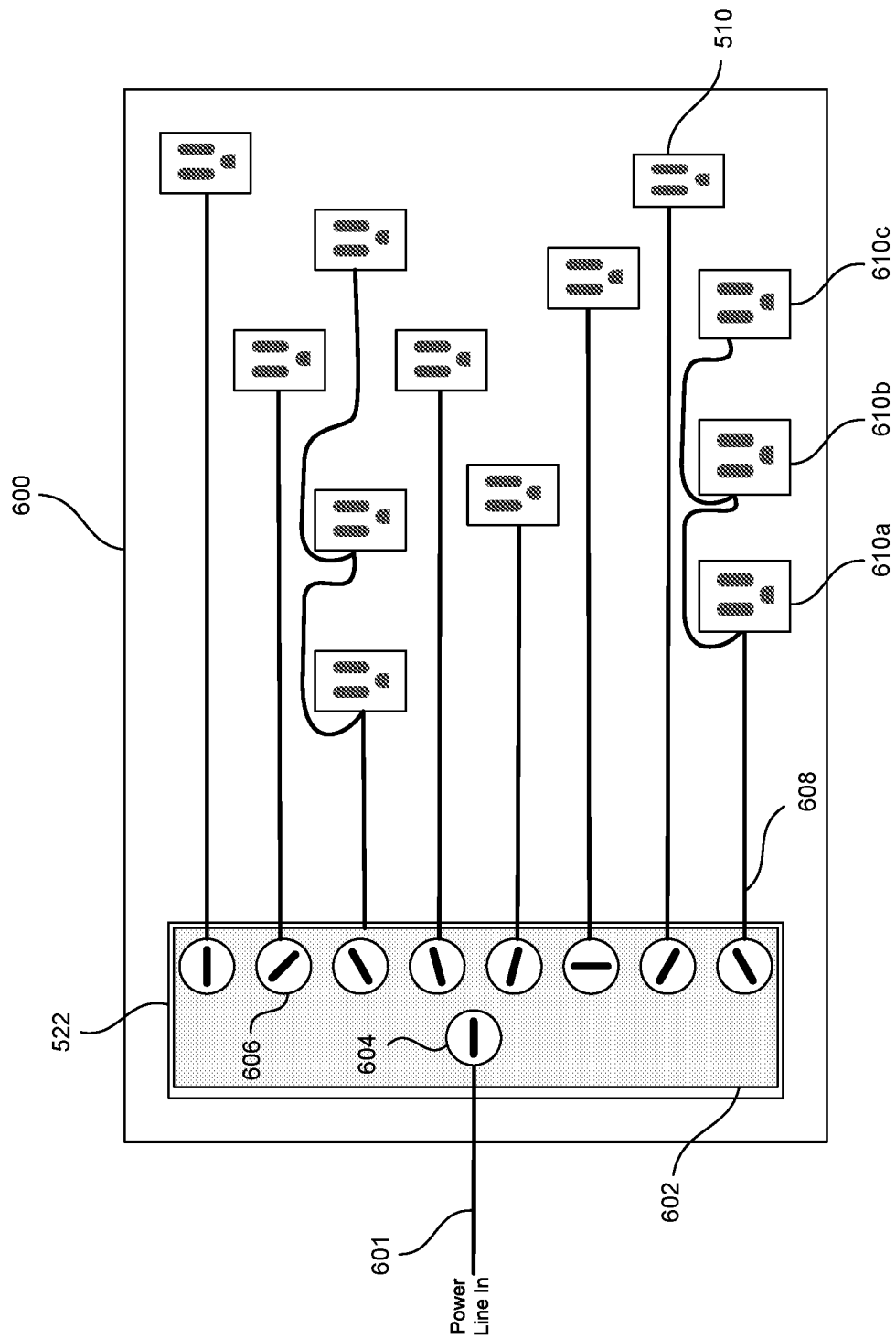
FIG. 6 is an illustration of a J-box within a room.

FIG. 6 is an illustration of a J-box 522 within a room 600. A single wire 601 may be run to a main terminal 604 of a J-box 522. The main terminal 604 may be in electrical contact with several distribution terminals 606 within the J-box 522. For example, a plate 602 of conductive material may provide continuity between the main terminal 604 and the distribution terminals 606 of the J-box 522. Each of the distribution terminals 606 provides a point to which one or more additional wires 608 can be connected to distribute power throughout the room 600. Accordingly, additional wires 605 can be connected to distribution terminals 606 to distribute AC power to a plurality of outlets 510 throughout the room 600. In some embodiments, a single distribution terminal 606 can be used to provide power to several AC outlets 610*a*, 610*b*, 610*c* by daisy chaining the outlets 610.

Returning attention to FIG. 5, one or more lighting devices 502 can be plugged into outlets 510. Plugging the device 502 into an outlet 510 provides AC power to the lighting element of the lighting device 502. In addition, devices 502 that are capable of being controlled by a power line communication controller 518 can receive signals through the power line from the controller 518*a*. The controller 518*a* can be plugged into any outlet 510 that is directly connected to the outlet 510*a*, thus connecting the controller 518*a* to all other devices 502 that are plugged into the power line network (i.e., bus 520). In this context, a device 502 is "directly connected" to a controller 518 if there are either no devices, or only devices that can pass signals with little or no detrimental impact on the ability of devices plugged into the bus 520 to receive commands from the controller 518*a*. For example, only J-boxes 522 comprising terminals connected by conductors (such as metal plates, wires, etc.) are present between the outlets 510.

Figure 7:
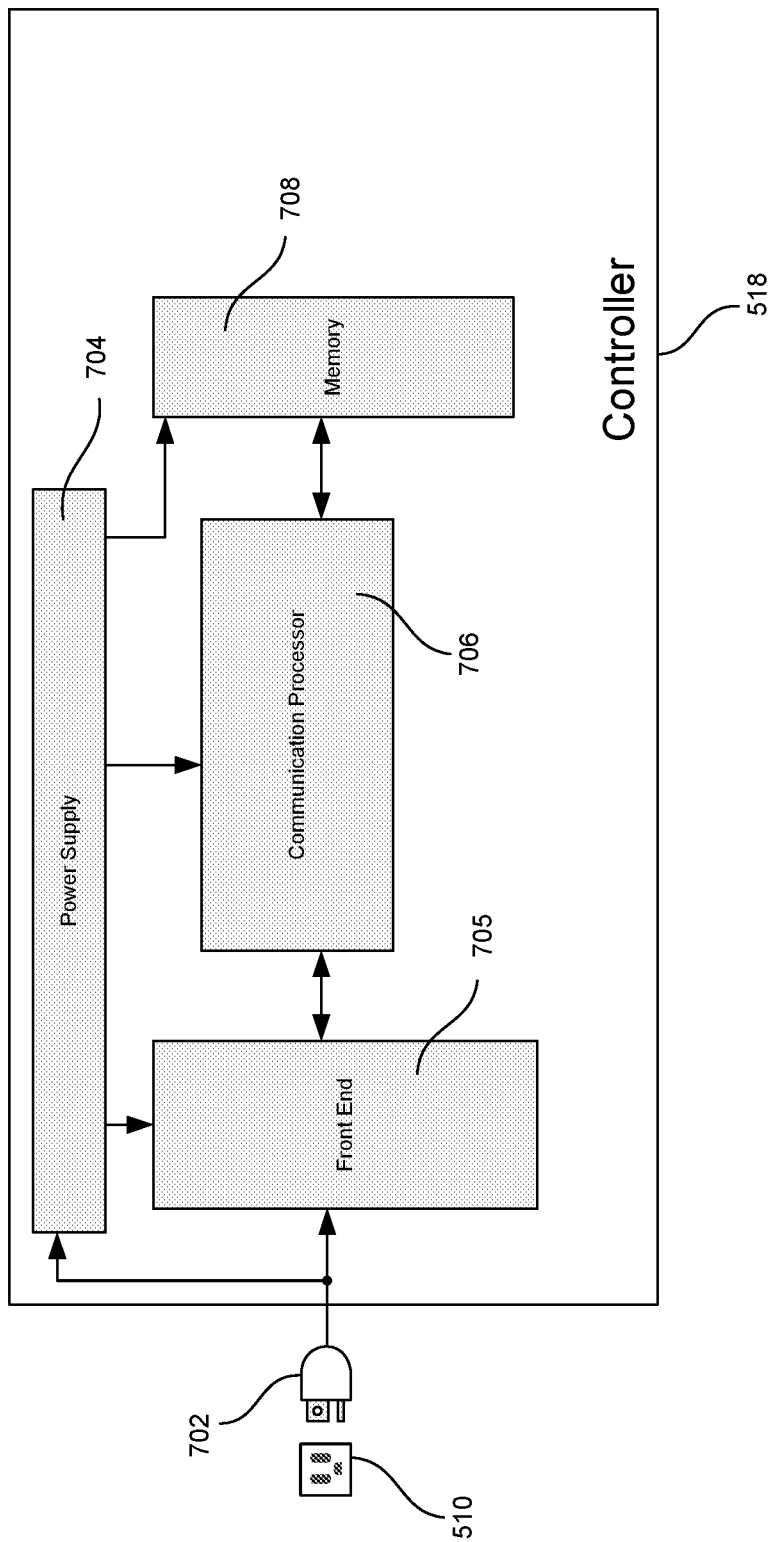
FIG. 7 is a simplified block diagram of a controller in accordance with some embodiments of the disclosed method and apparatus.

FIG. 7 is a simplified block diagram of a controller 518 in accordance with some embodiments of the disclosed method and apparatus. The controller 510 comprises an AC plug 702, a power supply 704, front end 705, a communication processor 706 and memory 708. The AC plug 702 is configured to be plugged into an AC outlet 510. The AC outlet 510 provides AC power to the power supply 704. The power supply 704 uses the 60 Hz AC power to generate DC power for the components of the controller 510, such as the front end 705, communication processor 706, and memory 708. In addition, the outlet 510 provides a means through which the controller 518 can modulate signals onto the 60 Hz AC line through the outlet 510. In addition, the front end 705 monitors the AC power line to detect interference that is present on the AC line.

Figure 8:
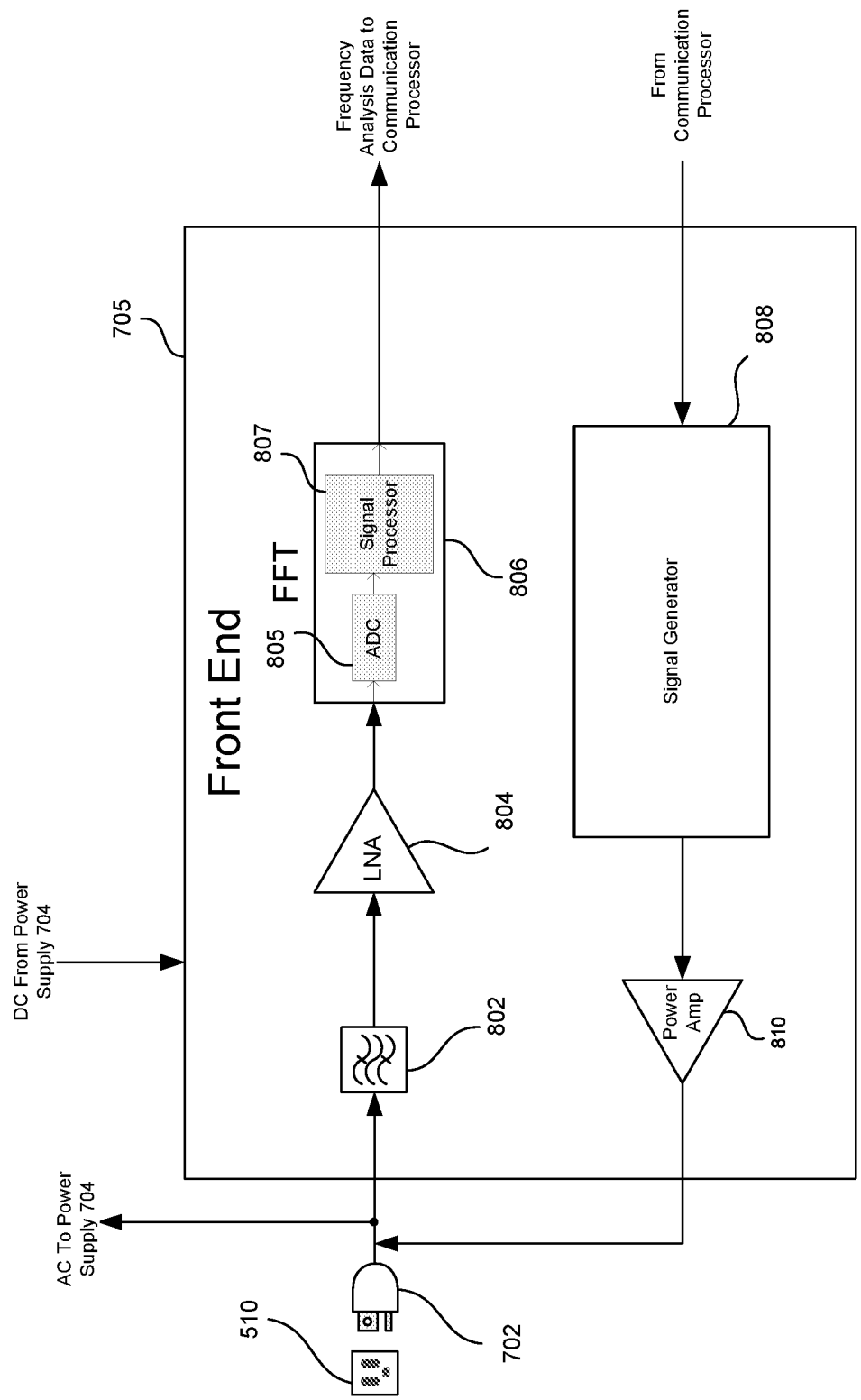
FIG. 8 is a simplified block diagram of the front end.

FIG. 8 is a simplified block diagram showing the front end 705 in more detail. In some embodiments, the AC line from the plug 702 runs to the power supply 704 and to a filter 802. The filter 802 reduces or removes the 60 Hz component from the filter output. The output of the filter 802 is coupled to a low noise amplifier (LNA) 804. The LNA 804 amplifies the signal such that the signal output from the LNA 804 is strong enough to be processed by a spectrum analyzer, such as a Fast Fourier Transform (FFT) module 806 to which the LNA 804 is coupled. Accordingly, the FFT module 806 has an input coupled through the LNA 804 to an AC outlet into which the controller 518 is plugged. The FFT module 806 is configured to detect, analyze and output the spectral content of a power line (i.e., provide frequency analysis data regarding the frequency content of the power line). In some embodiments, the FFT module 806 includes an analog-to-digital converter (ADC) 805, and a signal processor 807. The ADC 805 digitizes the signal output from the LNA 804 and the digital output of the ADC 805 is coupled to the input of the signal processor 807. The signal processor 807 performs the FFT operation on the digital data output from the ADC 805.

In addition, the front end 705 comprises a power amplifier 810 and a signal generator 808. The signal generator 808 receives a signal from the output of the communication processor 706. As will be described further below, the communication processor 706 has an input that receives the spectral content of the power line from the FFT module 806 to determine from the spectral content, when communications can be transmitted over the power line with a predetermined likelihood of success.

The signals provided by the communication processor 706 to the signal generator 808 cause the signal generator 808 to generate signals that serve as commands to devices 502 that are plugged into the power line through other AC outlets 510 around the building 500. Accordingly, the signal generator 808 is configured to output commands to be transmitted over the power line.

Accordingly, the communication processor 706 is configured to output control signals to the signal generator 808 to control the transmission of the commands output by the signal generator 808 based on an analysis of the spectral content received from the spectrum analyzer, i.e., the FFT module 806 in the particular embodiment of FIG. 8.

The output of the signal generator 808 is coupled to the input of the power amplifier 810. The power amplifier 810 amplifies the signal output from the signal generator 808 to ensure that the signal has sufficient power to be received by the devices 502 plugged into other AC outlets 510 around the building 500. Upon receiving the commands, the device 502 responds to the commands by controlling the functionality of the device 502 in accordance with the received command.

Figure 9:
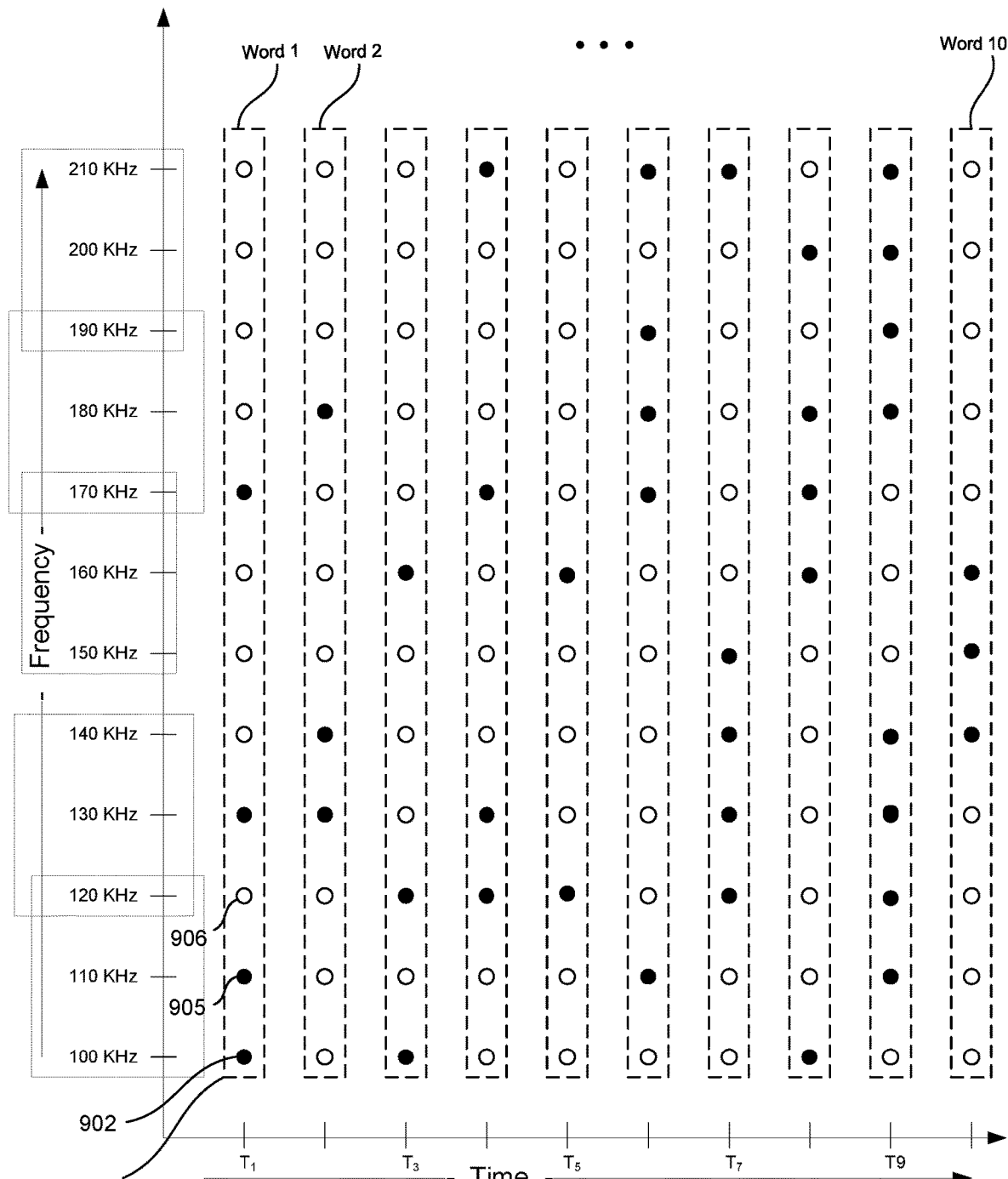
FIG. 9 is a plot of the frequency analysis data output from the FFT module.

FIG. 9 is a plot of one example of frequency analysis data output from the FFT module 806. This output data can be represented in several ways. The representation shown in FIG. 9 is one example. In this example, the output from the FFT module 806 is a sequence of digital words 904 serially output from the FFT module 806. Each word 904 indicates the spectral content of the interference on the power line at a particular point in time. Each bit 902 of each such word 904 indicates whether the power at a particular frequency assigned to that bit 902 is above or below a predetermined threshold at the time associated with the word 904. It should be clear that other formats for outputting the spectral content of the power line are possible.

In the example shown in FIG. 9, ten words are shown. Each word 904 has 13 bits 902, each of which is associated with a particular frequency. For example, at time $T_1$, interference having a power level that is above the predetermined threshold is present on the AC line at a frequency of 100 KHz. A first bit 902 of a first word 904 indicates the presence of the interference at 100 KHz at time $T_1$ by carrying a digital value of "1" (as indicated by the black dot 902). A second bit 905 indicates the presence of interference at 120 KHz. A third bit 906 of the word 904 indicates that interference at the frequency of 120 KHz is below the predetermined threshold at time $T_1$. From the example shown in FIG. 9, it can be seen that the word 904 output from the FFT module 806 and representing the spectral content of the line at time $T_1$ would have a value of 110 100 010 000. That value indicates that there is interference above the predetermined threshold for four of the 12 frequencies (i.e., 100 KHz, 110 KHz, 130 KHz and 170 KHz). Interference levels at the other 8 frequencies are below the predetermined threshold at time $T_1$.

The frequency analysis data output from the FFT module 806 can be used by the communications processor 706 to identify which frequency bands can be used to transmit information on the power line with a reasonable probability of being successfully received by an intended receiving device 502. That is, if the power present in a particular frequency band is below the predetermined threshold for a predetermined amount of time, that frequency band can be used with a relatively high probability that the receiving device 502 will successfully receive the commands sent by the controller 518. Continuous monitoring of the power line can be used to determine when that frequency band is no longer clear (i.e., no longer free of interference that is below the predetermined threshold). In some embodiments, in order to prevent very short bursts of interference from deterring the controller 518 from using a particular frequency band, the controller 518 may ensure that interference is present in a particular frequency band for a minimum amount of time before determining that it is unlikely that information modulated on the particular frequency band in question will have a sufficiently high probability of being successfully received by the intended receiving device 502. However, the particular algorithms used to determine the likelihood of success in communicating will depend in large part on the particular protocol used to send information over the power line, including the data rate and/or length of a bit, the frequency used to carry information, the particular modulation or keying technique, the power of the signal carrying the information, whether information is sent in short bursts or over longer periods of time, etc.

Figure 10:
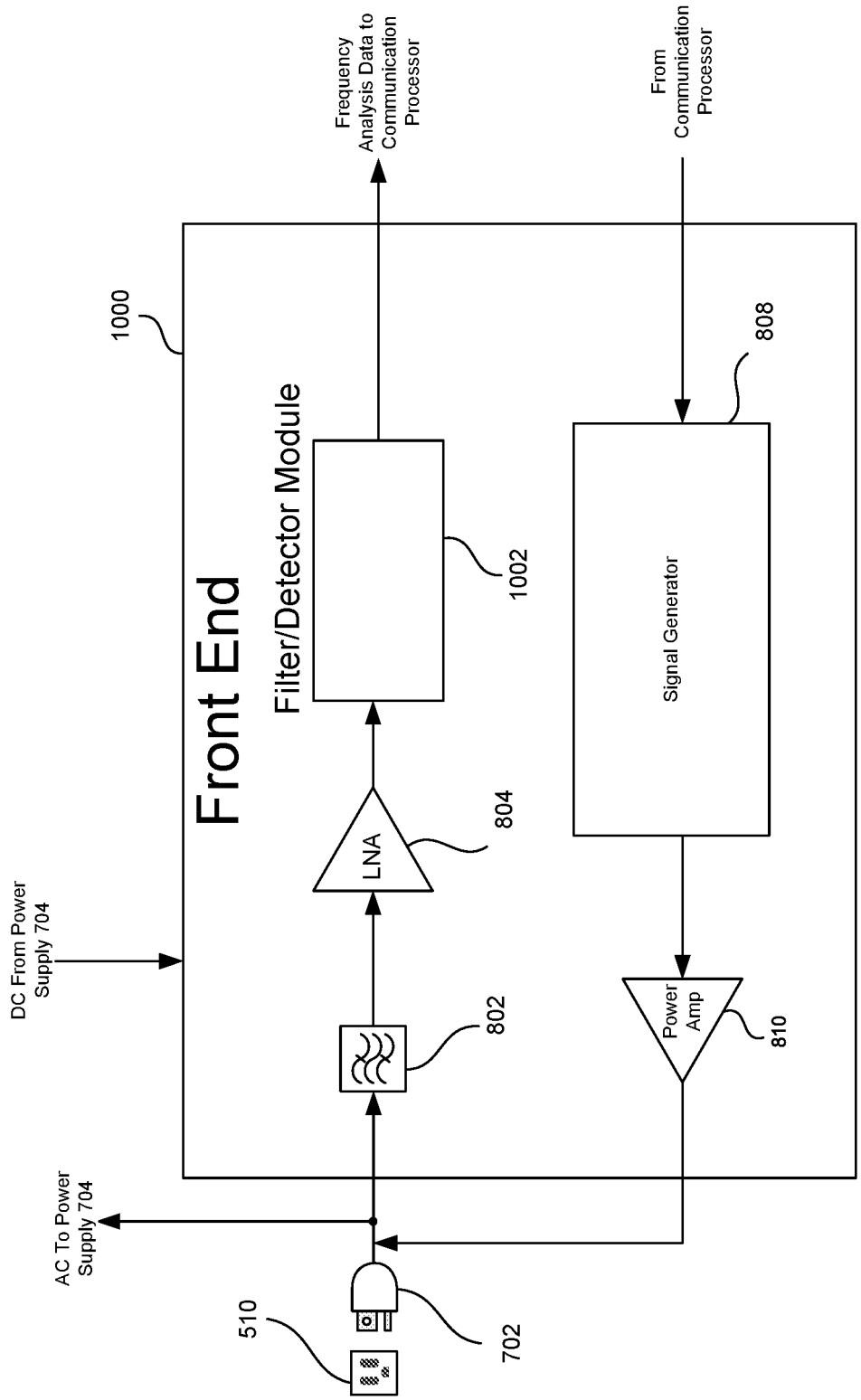
FIG. 10 is a simplified block diagram of a front end that can be used in place of the front end show in FIG. 7.

FIG. 10 is a simplified block diagram of a front end 1000 that can be used in place of the front end 705 show in FIG. 7. In the front end 1000, a filter/detector module 1002 is used in place of the FFT module 806 that is used in the front end 705.

Figure 11:
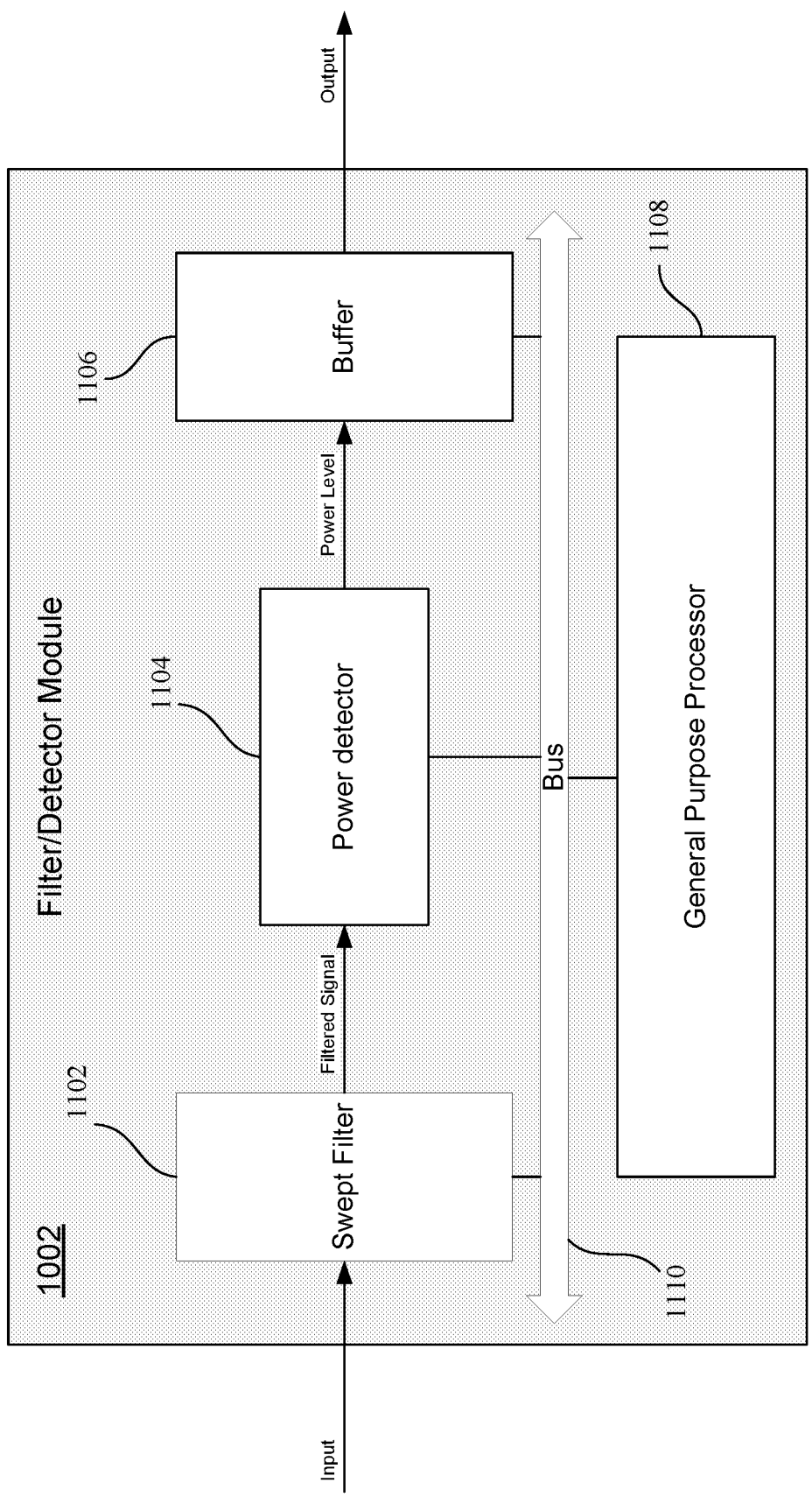
FIG. 11 is a simplified block diagram of a filter/detector module that can be used as one alternative to the FFT module.

FIG. 11 is a simplified block diagram of the filter/detector module 1002 that can be used as a spectrum analyzer to perform spectral analysis as one alternative to the FFT module 806. The filter/detector module 1002 can operate in the analog domain, rather than digitizing the signal received from the power line bus 520. The filter/detector module 1002 outputs the power level of each frequency bin at particular times. The particular architecture of the front end portion that captures the signal present on the power line can vary. In some embodiments, the filter/detector module 1002 may include an analog swept filter 1102 having an input and an output. The input is coupled to the output of the LNA 804 (see FIG. 8). The output of the swept filter 1102 is coupled to a power detector 1104. The power detector 1106 determines the amount of energy present within a frequency range. The frequency range is determined by the width of the filter 1102. Power is detected over a particular duration of time by the power detector 1104. The output of the power detector 1104 can be coupled to a buffer 1106 that stores the values for retrieval by a general purpose processor 1108. In some embodiments, the general purpose processor 1108 also controls and coordinates the operation of several of the components of the filter/detector module 1002, including the swept filter 1102, the power detector 1104 and the buffer 1106 through communications with the general purpose processor 1108 over a bus 1110. The general purpose processor 1108 determines which frequency is to be monitored, sets the swept filter to that frequency, turns on the power detector and causes the buffer 1106 to store the results output from the power detector 1104 in the buffer at an address associated with the time and frequency associated with the value output from the power detector 1104.

Alternatively, the filter/detector module 1002 can comprise a plurality of input filters coupled to sample and hold circuits, each coupled to a digitizer that provides a digital output representative of the amplitude of the signal captured by the sample and hold circuit.

Figure 12:
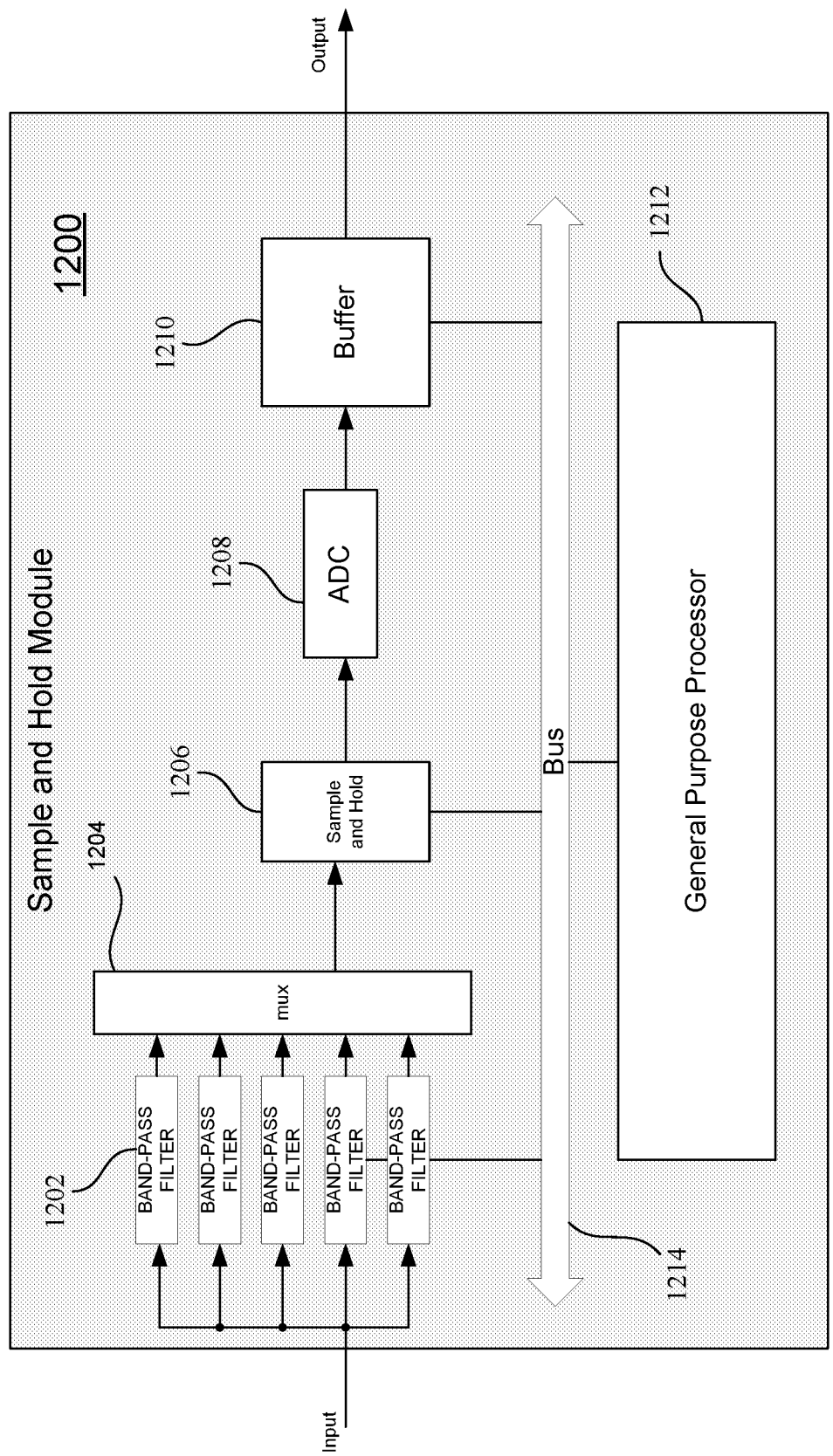
FIG. 12 is a simplified block diagram of a sample and hold module that can be used as another alternative to the FFT module.

FIG. 12 is a simplified block diagram of a sample and hold module 1200 that can be used as another alternative to the FFT 806. A plurality of band-pass input filters 1202 each have an input that is coupled to the output of the LNA 804 (see FIG. 8). In some embodiments, the LNA 804 is coupled to the input of each filter 1202. However, in an alternative embodiment (not shown for simplicity sake), an input multiplexer could selectively couple the output of the LNA 804 to one input filter 1202 at a time. An output from each input filter 1202 is coupled to an output multiplexer (MUX) 1204. The MUX 1204 selects one of the outputs to be coupled to a sample and hold circuit 1206. The sample and hold output is provided to an analog to digital converter (ADC) 1208. The output of the ADC 1208 is then coupled to a buffer 1210 in which the digitized value representing the amount of power present at each frequency associated with one of the filters 1202 can be stored. In some embodiments, a general purpose processor 1212 can be used to control and coordinate the process of sampling and digitizing the power level at each frequency. A bus 1214 from the general purpose processor 1212 to each of the other components allows the general purpose processor 1212 to communication with each of the components.

Figure 13:
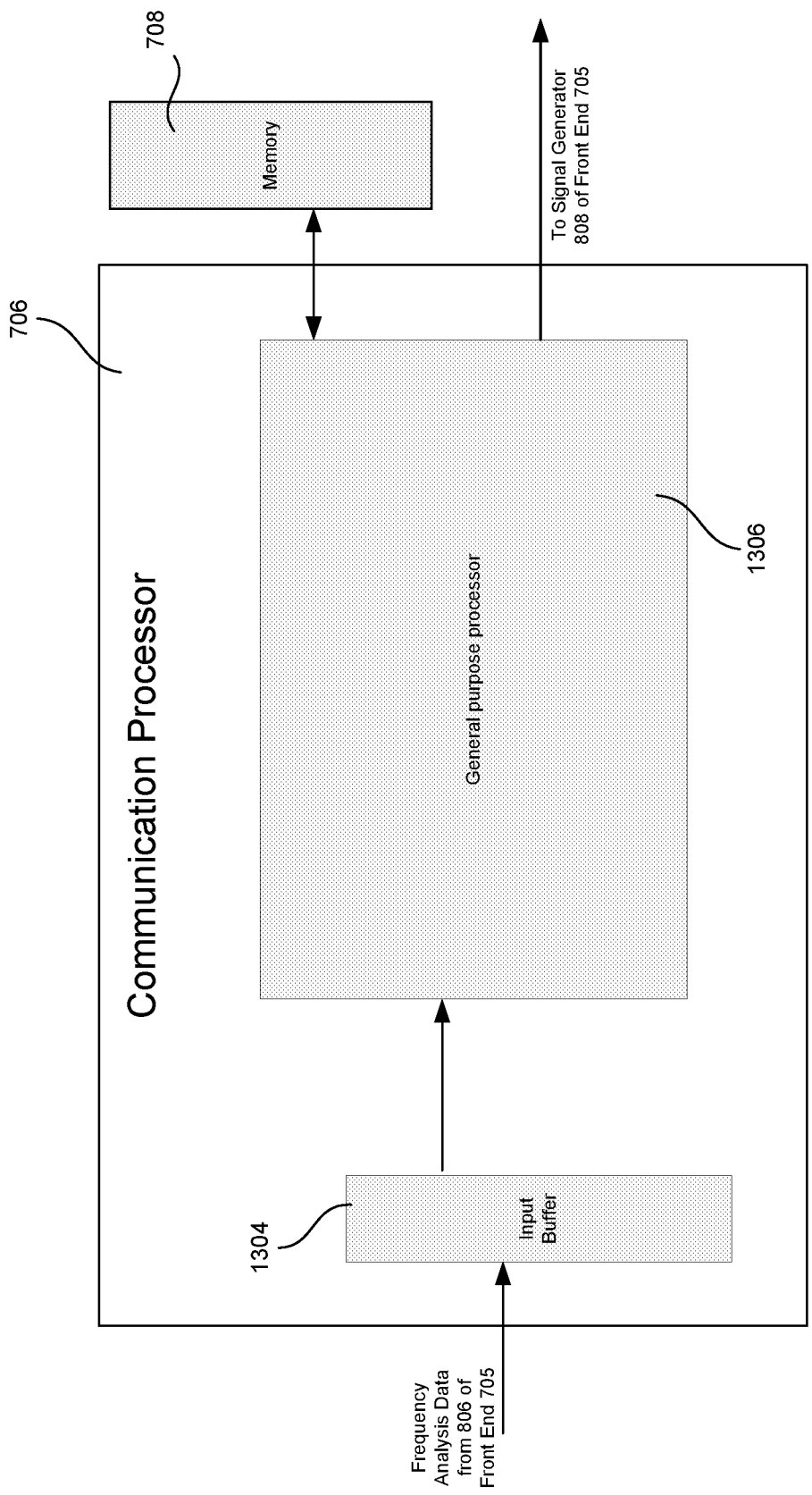
FIG. 13 is a simplified block diagram of the communication processor in accordance with some embodiments of the disclosed method and apparatus.

FIG. 13 is a simplified block diagram of the communication processor 706 in accordance with some embodiments of the disclosed method and apparatus. In some embodiments, the output of the FFT 806 is coupled to an input buffer 1304. Values indicating whether the power present in particular frequencies are above a predetermined threshold are stored in the buffer 1304. In some embodiments, a general purpose processor 1306 reads the values from the buffer 1304 and determines which time/frequency slots are available for use in communicating commands from the controller 518 to devices 502. For the purposes of this disclosure, a "time/frequency slot" is defined as a particular frequency range and period of time. The period of time can be defined by a start time and duration or start and stop times. In cases in which the information stored in the buffer 1304 includes the level of interference as well as whether there is interference present (i.e., whether the power level in the particular frequency band is greater than a threshold value), determinations may include selecting the time/frequency slot that has the lowest noise floor. Alternatively, other considerations and factors can be used to determine which time/frequency slot or slots to use. These considerations and factors may include frequency bands that have been less noisy recently (e.g., which frequency bands have had little or no interference for the greatest portion of time over a predetermined previous period of time), which tend to have the best record for successfully carrying commands, which have been free of interference in the particular time slot in the past several days, etc.

Figure 1:
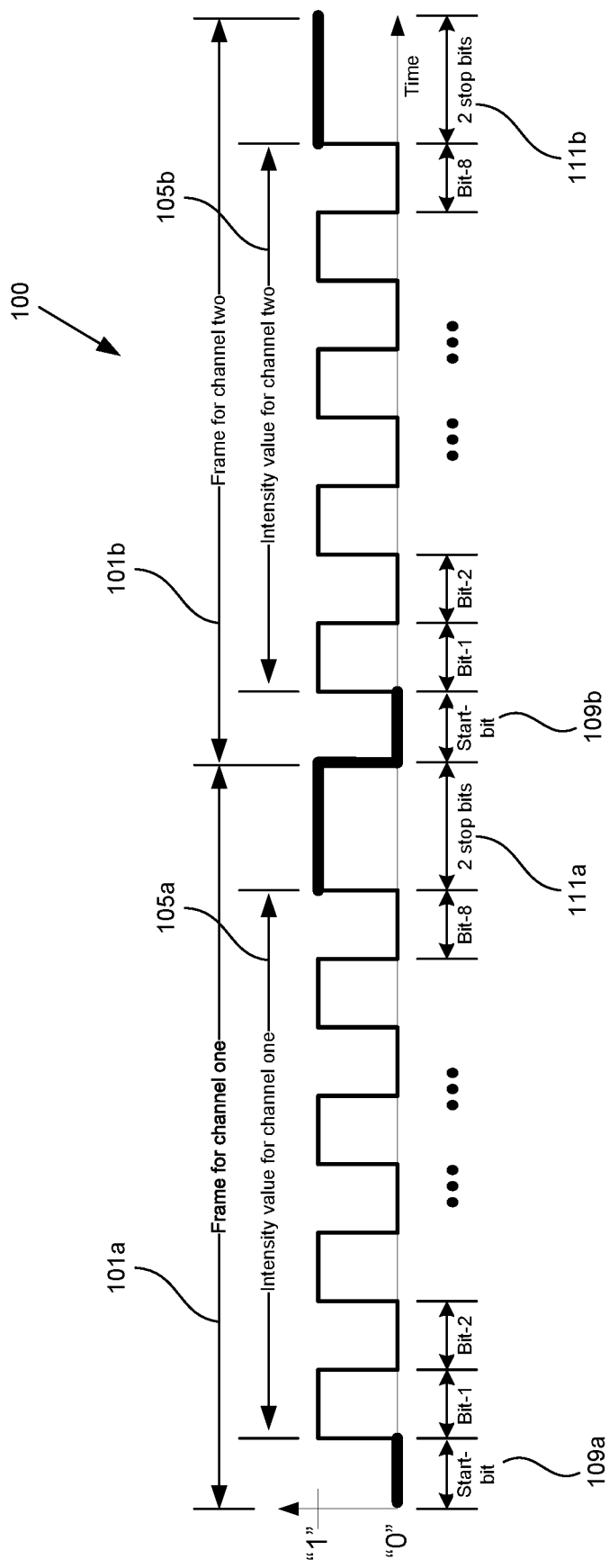
FIG. 1 shows two frames of a DMX signal.
Figure 2:
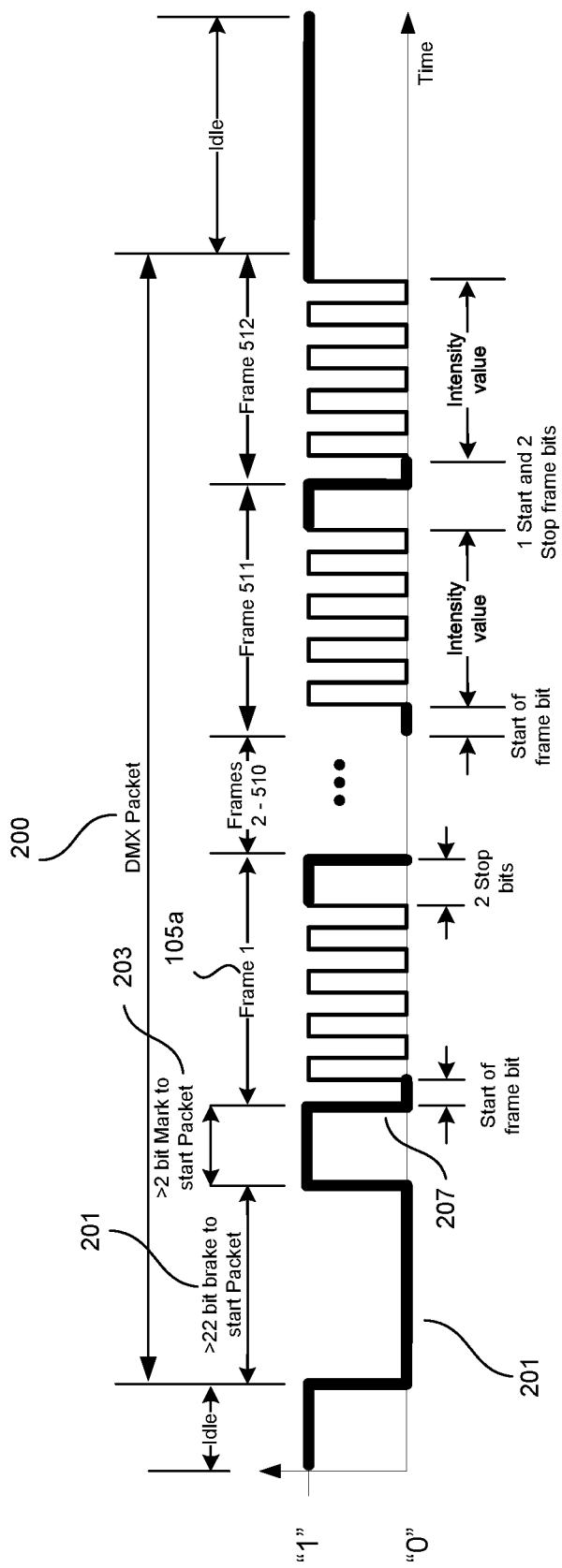
FIG. 2 shows an entire packet that includes the two frames shown in FIG. 1.
Figure 3:
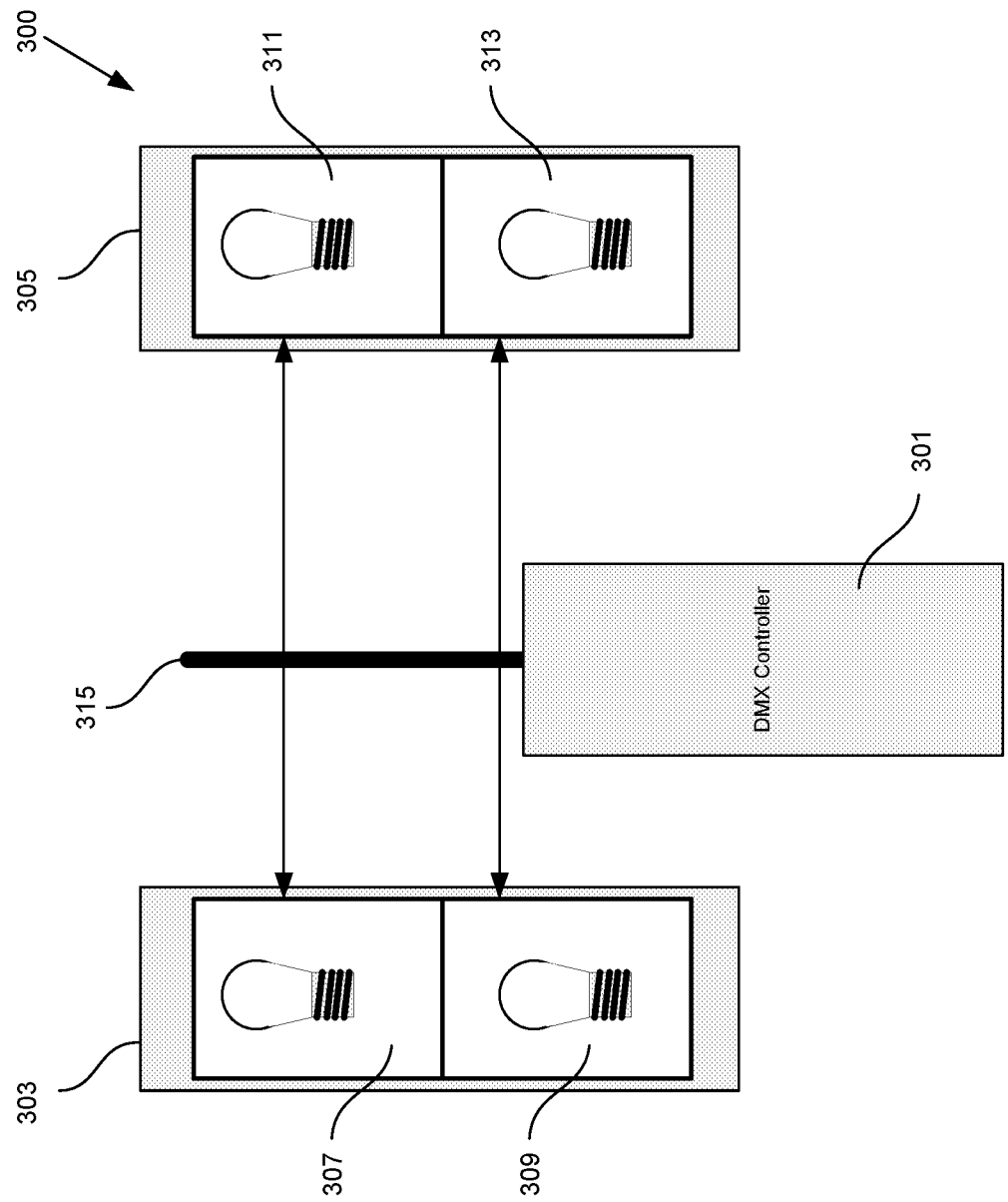
FIG. 3 is a schematic showing a DMX system including a DMX controller and two lighting devices, each lighting device having two lighting elements.
Figure 4:
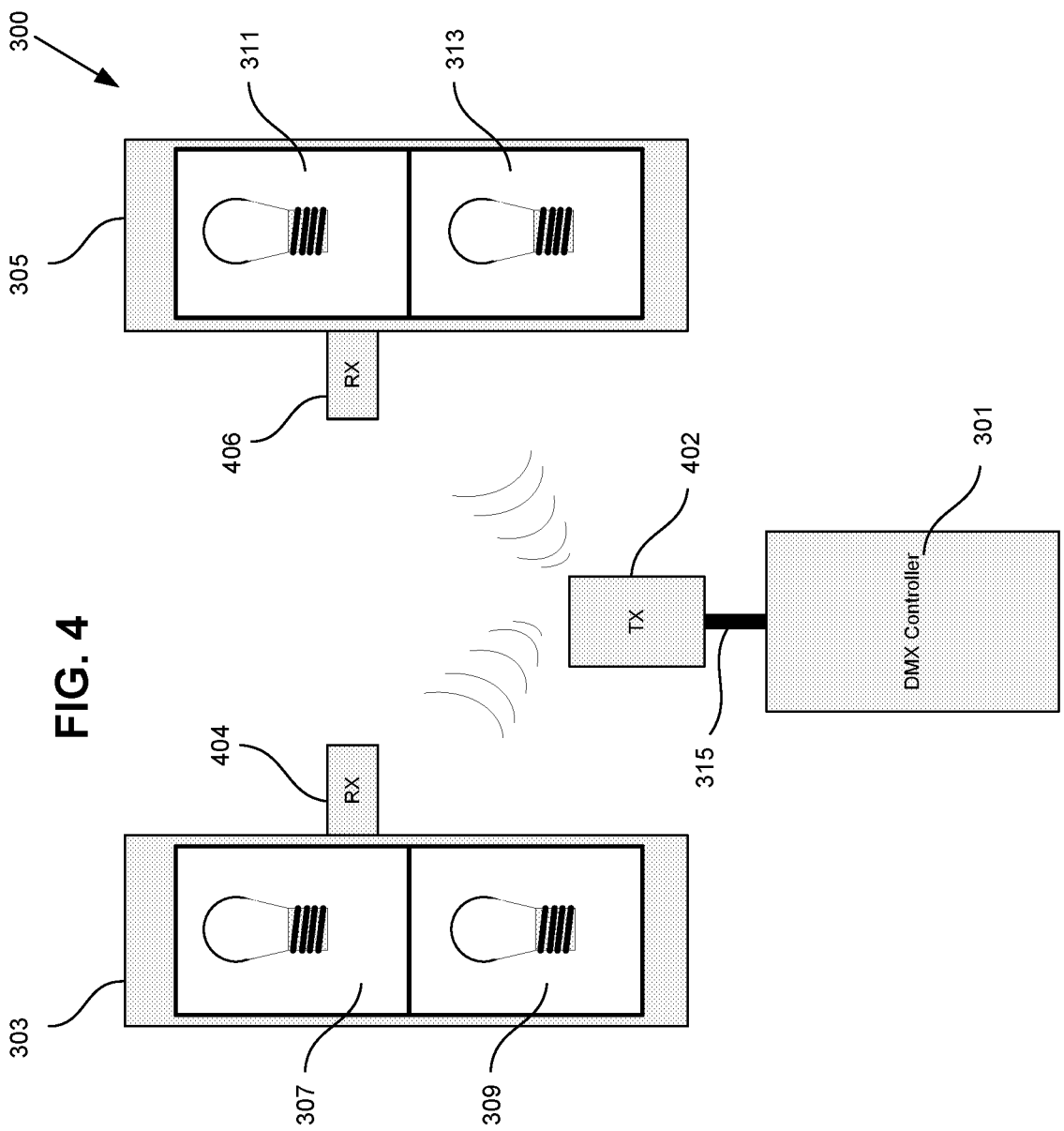
FIG. 4 is an illustration of a system in which a wireless bridge formed using a controlling transmitter and lighting device receivers allows signals to be communicated from a DMX controller to lighting elements.

Upon selecting a particular time/frequency slot over which to send a command, the general purpose processor 1306 controls a signal generator 808 to generate a command packet to be sent to a device 502 to be controlled. In accordance with some embodiments, the packet that is generated conforms generally to the DMX-512 standard. That is, the packet will look essentially like the DMX packet shown in FIG. 2. In accordance with some embodiments, the keying used to represent a logical one or zero is performed by having the signal generator 808 output a first tone to represent a logical one and a second tone to represent a logical zero. In other cases, one of the logical states is represented by the signal generator 808 being off (e.g., no signal output during logical one) and the other logical state is represented by the signal generator 808 being on (e.g., representing a logical zero). In some embodiments, the amplitude of the signal output by power amplifier 810 coupled to the signal generator 808 is 5 v-10 v.

Figure 14:
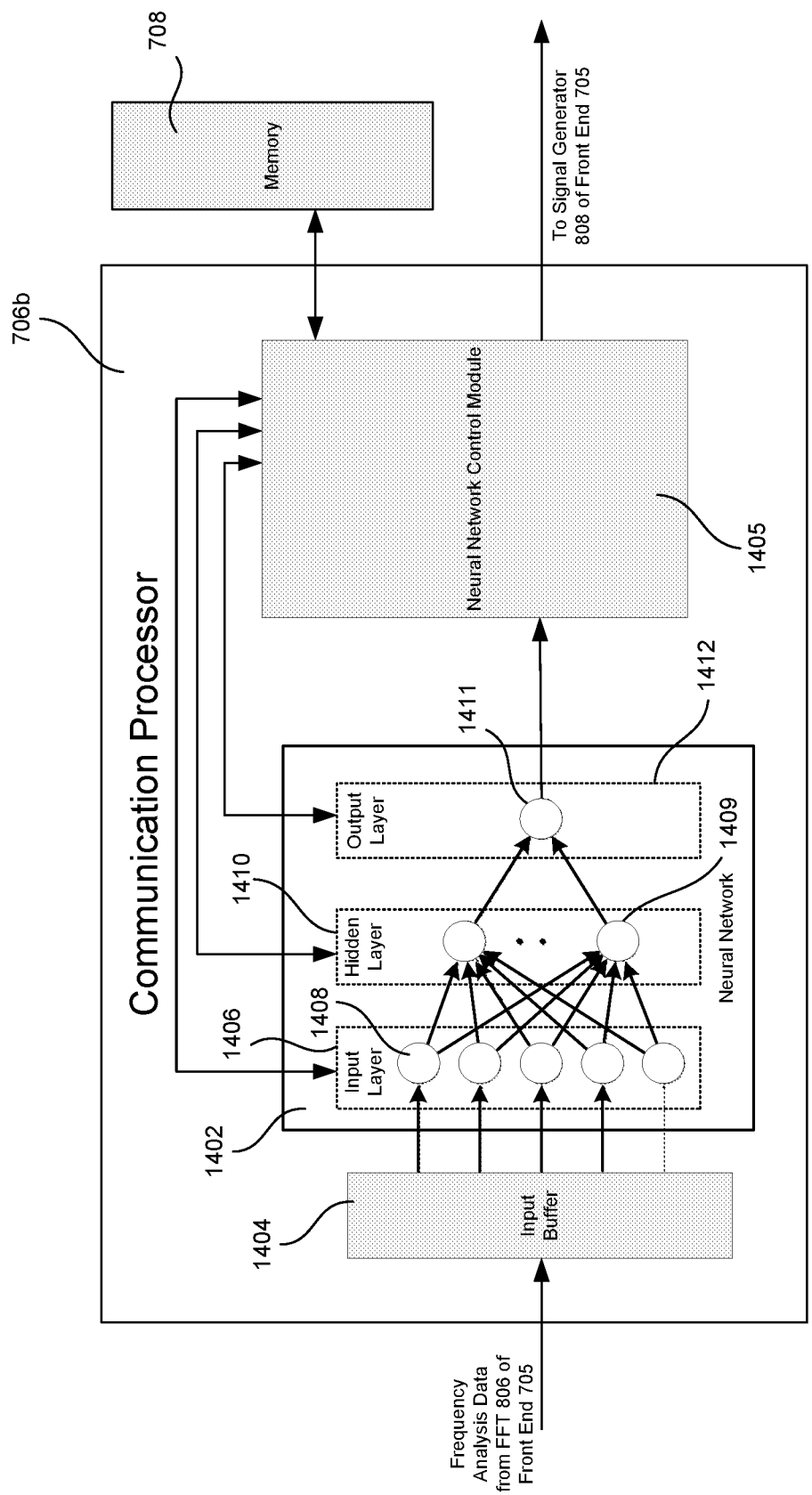
FIG. 14 is a simplified block diagram of a communication processor in accordance other embodiments of the disclosed method and apparatus.

FIG. 14 is a simplified block diagram of an alternative embodiment of the communication processor 706. The communication processor 706 shown in FIG. 14 comprises a simple neural network 1402, rather than the general purpose processor 1306 shown in FIG. 13. The neural network 1402 is merely an example of an artificial intelligence device that might be used. However, other AI devices, including other types of neural networks, may be used in place of the neural network 1402 shown in FIG. 14.

The neural network 1402 comprises an input layer 1406, one hidden layer 1410 and an output layer 1412. The input layer 1406 has input nodes 1408 that each receive input values. In some embodiments, the input values are provided from an input buffer 1404. In some embodiments, the input node 1406 combines the received input value with a weight, typically using a non-linear relationship between the input and the weight. The output of each input node 1406 is coupled to each of a plurality of hidden nodes 1409 within the hidden layer 1410. It should be noted that in some embodiments, there may be several hidden layers (not shown). Each hidden node 1409 combines another weight with the values that were output from each of the input nodes 1408, again typically using a non-linear relationship between the plurality of inputs and the weight. Finally, the output node 1411 combines the output of each hidden node 1409 of the last hidden layer 1410 with another weight, typically using yet another non-linear relationship. The output of the output node 1411 is provided as the output of the neural network 1402.

The particular values of the weights combined at each node 1408, 1409, 1411 are typically set through a "training procedure". A neural network control module 1405 may be used in some embodiments to control the neural network 1402, including controlling the training procedure used to determine weights that are applied at each node 1408, 1409, 1411 of the neural network 1402.

In some embodiments, the frequency analysis data provided by the FFT module 806 of the front end 705 can be applied through an input buffer 1404 to the input nodes 1408 of the neural network 1402. In some embodiments, the input buffer 1404 initially receives the frequency analysis data output of the FFT module 806. The input buffer 1404 formats the data for presentation to the input nodes 1408 of the input layer 1406.

The example shown in FIG. 14 shows an input layer 1406 having five input nodes 1408. However, the number of input nodes 1408 present in the input layer 1406 will depend in large part on the particular needs of the particular power line communication system in which the controller 518 is being used. In one example, in which five input nodes 1408 are provided, each input node 1408 receives a value that represents the presence of interference on a plurality of frequencies for which the FFT module 806 outputs a value. For example, a first of the input nodes 1408a may receive values indicating whether the first three frequency bins (i.e., 100 KHz, 110 KHz, 120 KHz) have sufficient power to indicate the presence of interference that is above a predetermined power threshold (i.e., whether the bins "detect interference"). A second of the input nodes 1408b may receive values indicating whether the third, fourth and fifth frequency bins (i.e., 120 KHz, 130 KHz, 140 KHz) detect interference. A third input node 1408c may receive values indicating whether the seventh, eighth and ninth frequency bins (i.e., 150 KHz, 160 KHz, 170 KHz) detect interference. A fourth input node 1408d may receive values indicating whether the ninth, tenth, and eleventh frequency bins (i.e., 170 KHz, 180 KHz, 190 KHz) detect interference. A fifth input node 1408e may receive values indicating whether the eleventh, twelfth and thirteenth frequency bins (i.e., 190 KHz, 200 KHz, 210 KHz) detect interference.

It should be understood that if patterns of interference over time are to be detected, then the input nodes 1406 should be provided with information from several points in time. For example, in some embodiments, 20 input nodes 1406 may be present in the input layer 1408. Each group of five input nodes 1406 is mapped to receive information about the frequency bins as noted above. However, each group of five input nodes 1406 receives information regarding a different slot in time (e.g., $T_1$, $T_2$, $T_3$, $T_4$).

It should be understood that the particular mappings of frequency bins to input nodes 1408 discussed above are merely provided as examples of how frequency analysis data output from the FFT module 806 might be mapped to the input nodes 1408 of a neural network, such as the neural network 1402 shown in the example of FIG. 14. However, there are several alternatives for mapping the frequency analysis data output from the FFT module 806 to input nodes of a neural network generally, and to the particular input nodes 1408 of the example neural network 1402 shown in FIG. 14.

Depending upon the particular mapping of FFT outputs to neural network input nodes, the weight combined with the input at each node of the neural network and the non-linear relation used to combine the weight with the input values, the neural network can provide predictions regarding which frequencies to use. That is, predictions can be made as to when to transmit information to devices 502 that are plugged into power outlets 510a, 510b, 510c connected to the power outlet 510d into which the controller 518a is plugged and over which frequencies to transmit with the highest likelihood of success.

In some embodiments, training of the neural network 1402 is performed by introducing signals to the power line that are the same as (or very similar to) interference that might be present on the power line. In some cases, actual interference can be monitored manually and training performed during periods in which particular interference patterns are present. During such training periods, the weights to be applied to each node of each layer 1406, 1410, 1412 of the neural network 1402 are adjusted and the output of the neural network monitored. The set of weights that, when applied together, provide the clearest indication at the output of the neural network 1402 that the input matches the condition sought to be detected (i.e., indications of the presence and lack of presence of interference in each of the frequency bins), are saved and used to detect interference. When other patterns are presented at the input of the FFT module 806 (i.e., patterns that do not match the pattern of interference sought to be detected during that portion of the training procedure) the output of the neural network is checked to ensure that the particular weights do not result in false positives. Adjustments are made to the weights until application of those weights results in positive indication of interference when interference is present with a minimum (i.e., acceptable) risk that false positives will occur. It will be understood by those skilled in the art that the level of risk that is acceptable may vary from application to application. Therefore, setting a predetermined level of risk that is acceptable is part of the training process. In some instances, the input data provided to initiate the training process includes a variable that indicates the particular level of risk that is acceptable in the context of that particular training process.

In some cases, weights that are used to detect interference in one particular frequency bin may be different from the weights used to detect interference in one or more of the other bins. Accordingly, the weights can be maintained in a memory, such as the memory 708 within the controller 518. The particular weights used to detect interference in a desired frequency bin are selected from memory by the neural network control module 1405 and applied to each input node 1408 to facilitate detecting interference in the desired frequency bin.

For the purposes of this discussion, interference is deemed to be present when communications between the controller 518 and a device 502 can be established with a high probability of success. Establishing communication with a high probability of success is defined herein to mean that commands sent from the controller 518 to the device 502 to which the command is directed will result in execution of the command by the device 502 with an acceptable probability. It should be noted that there is an inverse relationship between the probability that is defined to be "acceptable" and frequency with which a power line will support communication at that probability. That is, the higher the probability of success that is considered acceptable, the lower the likelihood that the power line can support communication with that probability of success. Nonetheless, the presently disclosed method and apparatus allows the user to determine what probably of success is acceptable in the particular application. The neural network 1402 can then be trained to determine whether the power line can support communication with that probability of success.

More complex training procedures can be established for training the neural network 1402 to detect particular patterns that identify time slots during which a particular frequency band will be available. That is, the neural network 1402 can be used to identify a time slot during which communication between the controller 518 and a particular device 502 or set of devices 502 can be established with a high probability of success. For the purposes of this example, a time slot is defined as a period of time that starts at a particular time and has a particular duration. Some examples of this might include training that identifies particular use patterns for appliances and other sources of interference. For example, in a power line communication system used in a hotel, it may be possible for the neural network 1402 within the controller 518 to detect that it is less likely that interference will occur from 9:00 AM to 9:45 AM and more likely that such interference will occur from 9:45 AM to 12:00 PM. In the case of a hotel, this might be due to the vacuuming schedule that the cleaning service keeps for vacuuming the carpets in the hotel. Such patterns may not be easily identified without the use of the analysis that can be performed by a neural network. Even more difficult to identify might be particular patterns of an individual appliance. For example, it may be possible for a neural network to identify the particular pattern of interference that results from a dishwasher or clothing washing machine going through the course of wash/rinse/dry cycles. Particular frequencies and timing of the interference may be predictable based on the patterns that such machines have in performing their normal functions. Even more complex patterns may be identified that are not easily predicted by humans, but that can be identified by the disclosed method and apparatus. For example, it may be possible to detect patterns of interference from external sources, such as cellular towers and nearby factories or from internal sources, such as cell phones or machinery within the facility. The nature of the source may be such that patterns in the interference exist that make it possible for the neural network to predict when such interference is likely to start and stop, how long interference might remain low and for how long such interference might remain high. Each such determination might be made on a frequency-by-frequency basis.

In some embodiments, once it is determine that there is a time/frequency slot available over which there is an acceptable probability of that a command can be transmitted successfully to a receiving device, the controller 518 uses a protocol that is based on the well-known DMX-512 protocol to send a command to the device 502.

Figure 15:
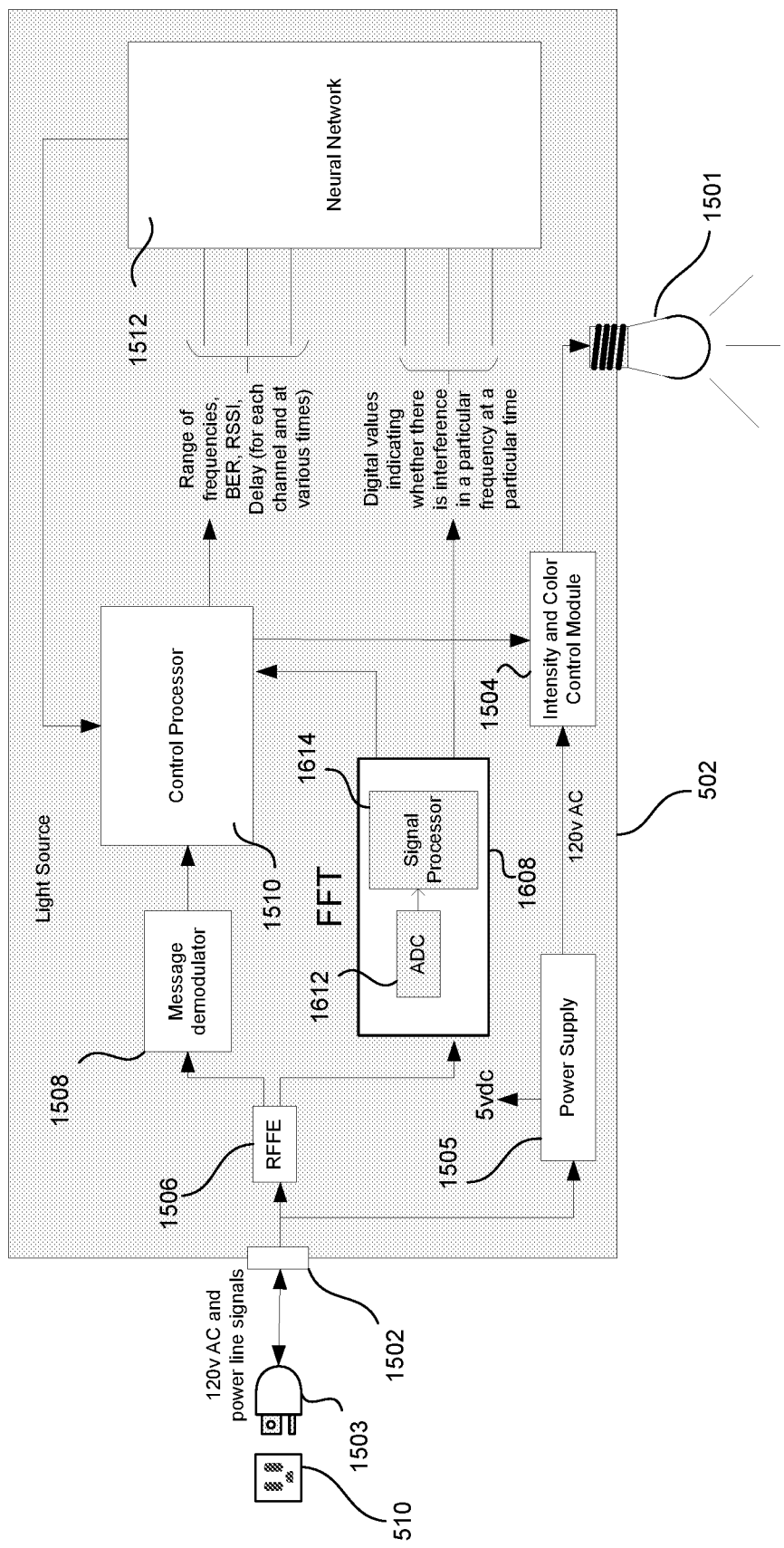
FIG. 15 is a simplified block diagram of one embodiment of a device, such as a device having a light source (i.e., a lighting device).

FIG. 15 is a simplified block diagram of one embodiment of a device 502, such as a device having a light source 1501 (i.e., a lighting device). In some embodiments in which the device 502 is a light source, the device 502 comprises the light source 1501, a power line input 1502, an AC plug 1503, an intensity and color control module 1504, a power supply 1505, a front end (FE) module 1506, a message demodulator 1508, a control processor 1510, a signal analyzer 1511 and a neural network 1512.

The power line input 1502 is coupled to the AC plug 1503. The AC plug 1503 provides a connection between an AC outlet 510 and the device 502. The device 502 receives 120 VAC power from the outlet 510 through the AC plug 1503. In some embodiments, the AC power coupled to the power supply 1505. The power supply 1505 provides AC power to the light source 1501, as well as DC power the circuity that is used to control the light source 1501 and handle communications over the wire line. An AC to DC power converter within the power supply 1505 converts a portion of the 120 VAC power to a DC voltage that is appropriate for powering the circuitry within the light source, such as the intensity and color control module 1504, active elements within the FE module 1506, the message demodulator 1508, the control processor 1510, the signal analyzer 1511 and a neural network 1512. It should be noted that the connections from the power supply to each of these components are not expressly shown in FIG. 15 for the sake of simplifying the figure. However, the 5 vdc output from the power supply 1505 should be understood to be connected to each component of the light source 1500 that has active components that require dc power. In addition, the power line input 1502 is coupled to a front end module 1506.

Figure 16:
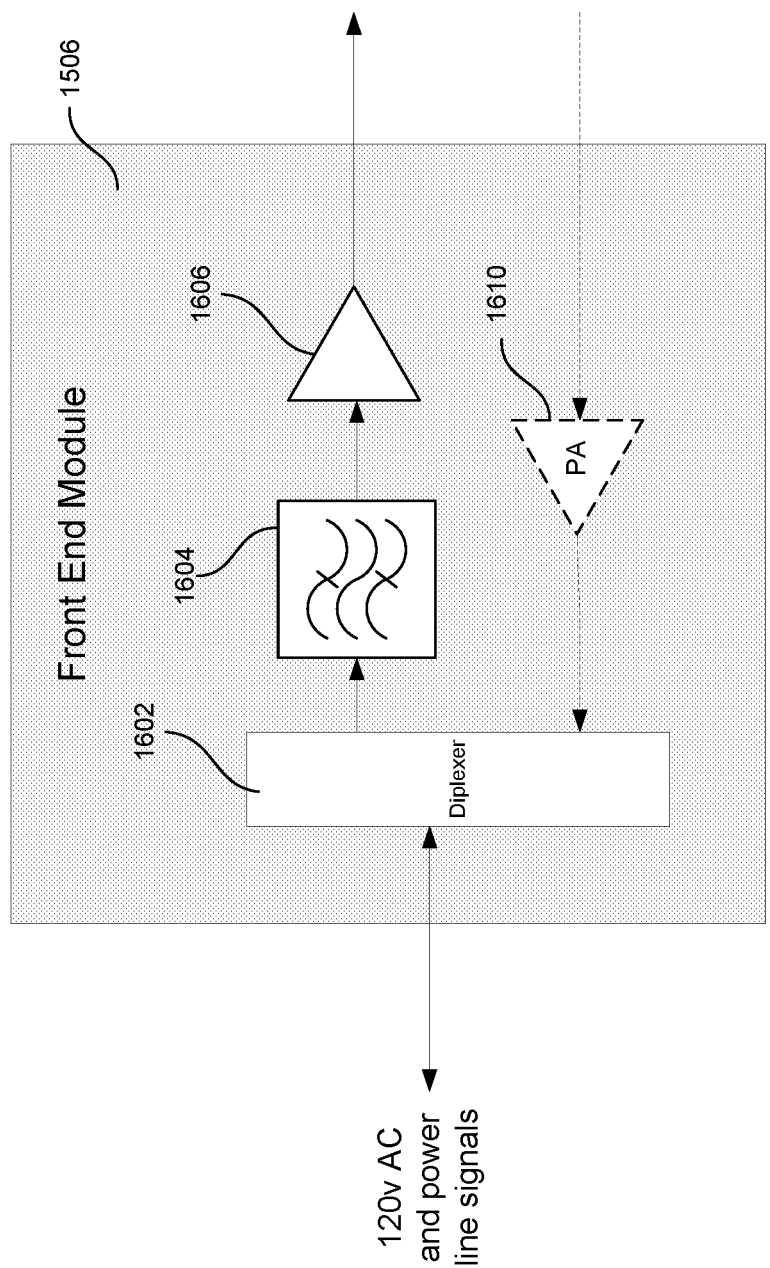
FIG. 16 is a simplified block diagram of the front end module.

FIG. 16 is a simplified block diagram of the front end module 1506. The front end module 1506 has a diplexer 1602, filter 1604, low noise amplifier (LNA) 1606, Fast Fourier Transform (FFT) module 1608 and a power amplifier 1610. The front end module 1506 comprises a diplexer 1602, a filter 1604, a low noise amplifier (LNA) 1606 and a power amplifier 1610. It will be understood that other components, such as additional filters, may be present in the front end module 1506. The front end module 1506 is coupled directly to the AC plug. Accordingly, both the 120 VAC and the power line signals are presented to the diplexer 1602. In some embodiments, a filter (not shown for simplicity) may be used to pass only the power line signals and block the 120 VAC. The diplexer 1602 ensures that signals that are received by the front end module 1506 are passed through to the filter 1604 and LNA 1606. Signals that are output from the power amplifier 1610 will be directed by the diplexer 1602 to the AC plug for transmission over the power line to which the AC plug is connected.

Figure 17:
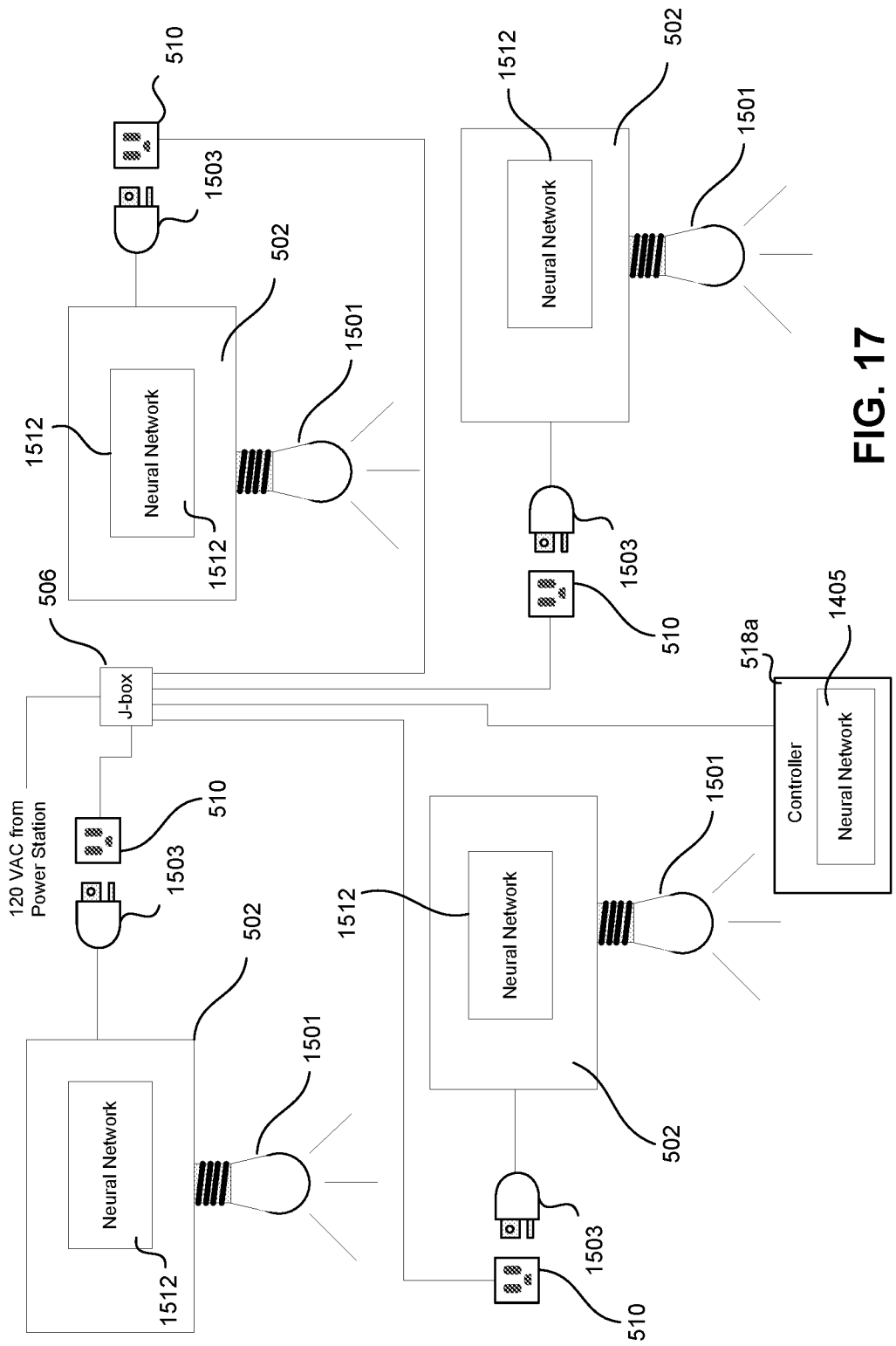
FIG. 17 is a simplified illustration of a network of devices, each having a compact and highly efficient neural network that can either function independently or in collaboration with one or more of the neural networks in other devices and/or with the neural network within a controller.

FIG. 17 is a simplified illustration of a network of devices 502, each having a compact and highly efficient neural network 1512 that can either function independently or in collaboration with one or more of the neural networks 1512 in other devices 502 and/or with the neural network 1405 within the controller 518a. In some embodiments, the inputs layer of each of the neural networks 1512 can be connected to a common first hidden layer with the neural network 1405 within the controller 518a. Accordingly, the combination of the first layer elements of each of the neural networks 1512 form a first layer of a composite neural network that includes the neural network 1405, which provides the hidden layers and the output layer for the composite neural network that is formed by the combination of neural networks 1512 in each device 502 and the neural network 1405 that is present in the controller 518.

Although the disclosed method and apparatus is described above in terms of various examples of embodiments and implementations, it should be understood that the particular features, aspects and functionality described in one or more of the individual embodiments are not limited in their applicability to the particular embodiment with which they are described. Thus, the breadth and scope of the claimed invention should not be limited by any of the examples provided in describing the above-disclosed embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide examples of instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosed method and apparatus may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described with the aid of block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A power line communication controller comprising:
   a) a front end comprising:
      i. a spectrum analyzer having an input coupled to an AC outlet into which the controller is plugged and configured to detect, analyze and output the spectral content of a power line; and
      ii. a signal generator configured to output commands to be transmitted over the power line;
   b) a communication processor having an input and an output, the input coupled to the output of the spectrum analyzer and configured to:
      i. receive the spectral content of the power line;
      ii. determine, from the spectral content, when interference is present and when communications can be transmitted over the power line with a predetermined likelihood of success and which frequencies are clear of interference at a particular time and send a transmission at a particular frequency and time when interference is unlikely to be present; and
      iii. output control signals to the signal generator to control the transmission of the commands output by the signal generator based on an analysis of the spectral content, the analysis having been received from the spectrum analyzer, the control signals causing the transmission of the command output to occur when the power line is clear enough of interference that the communications can be transmitted over the power line with the predetermined likelihood of success.

2. The power line communication controller of claim 1, wherein the spectrum analyzer is a Fast Fourier Transform (FFT) module.

3. The power line communication controller of claim 1, wherein the spectrum analyzer is a filter/detector module.

4. The power line communication controller of claim 1, wherein the output of the spectrum analyzer is a sequence of words, each word representing whether interference present on the power line is above a predetermined threshold.

5. The power line communication controller of claim 4, wherein the predetermined threshold is set based upon a determination as to the amount of interference that would result in an unacceptable likelihood of a successful communication between the power line controller and a device to which the power line controller is attempting to send commands.

6. The power line communication controller of claim 1, wherein the communication processor comprises an artificial intelligence module.

7. The power line communication controller of claim 6, wherein the artificial intelligence module is a neural network.

8. The power line communication controller of claim 7, wherein the neural network determines the likelihood that communications from the power line communication controller will be successfully received by a device plugged into an AC output on the power line.

9. The power line communication controller of claim 8, wherein the neural network predicts when communications from the power line communication controller to at least one device plugged into an AC outlet of the power line will have a likelihood of success that is acceptable.

10. The power line communication controller of claim 8, wherein the neural network predicts which frequency from among a predetermined set of frequencies will support communications from the power line communication controller to at least one device plugged into an AC outlet of the power line with an acceptable likelihood of success.

* * * * *